Nov. 17, 1959   I. N. SONIER   2,913,049
CARD PUNCHING DEVICE
Filed May 25, 1959   8 Sheets-Sheet 2
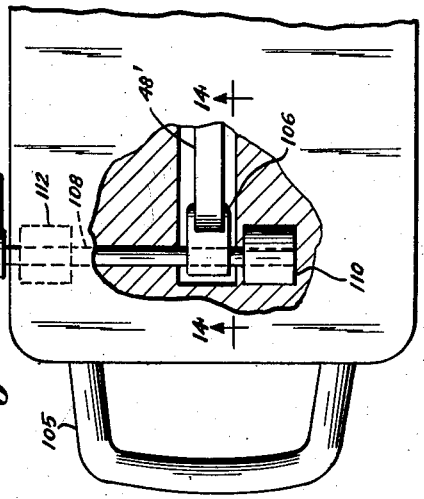
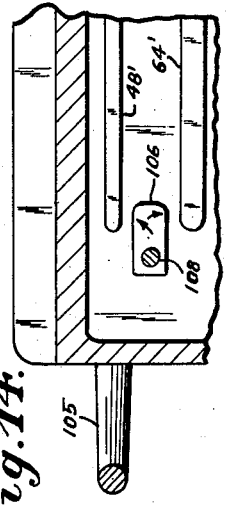
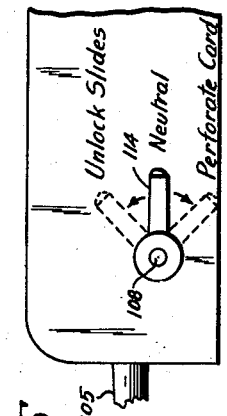
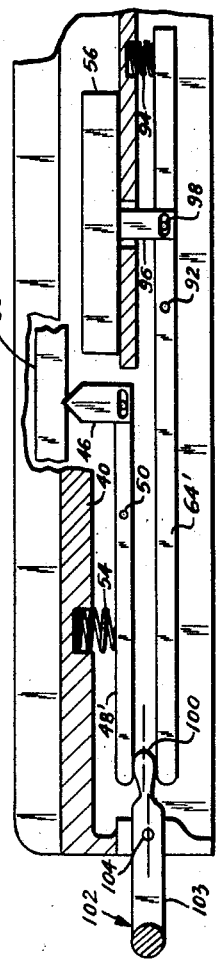
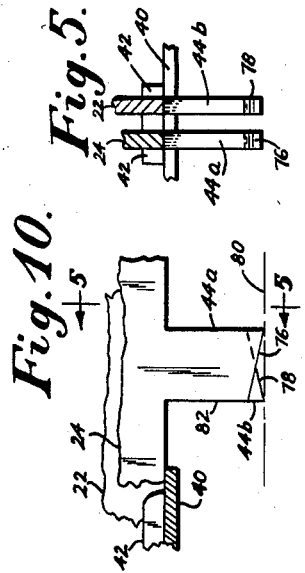
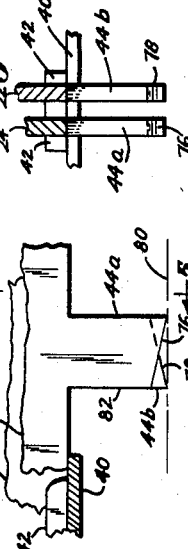
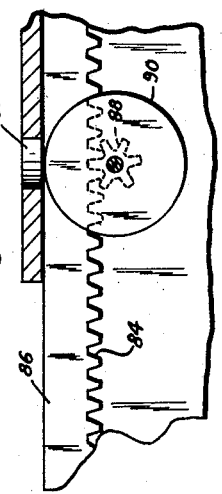
INVENTOR
IROY N. SONIER
BY Cushman, Darby & Cushman
ATTORNEYS

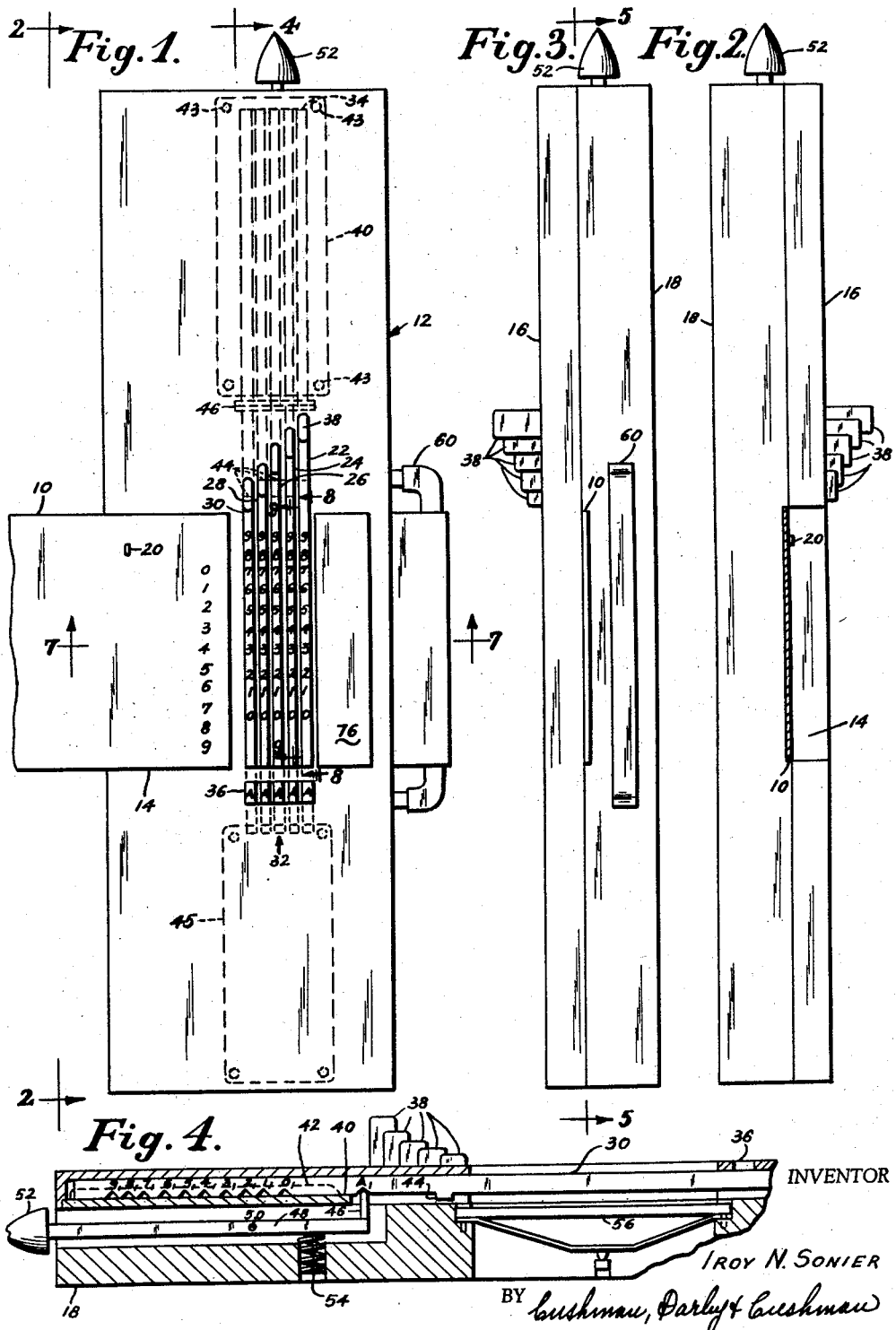

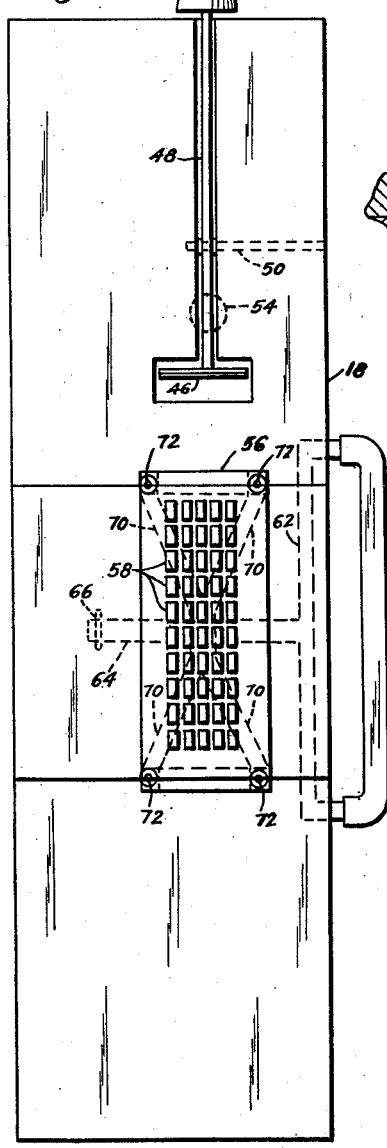
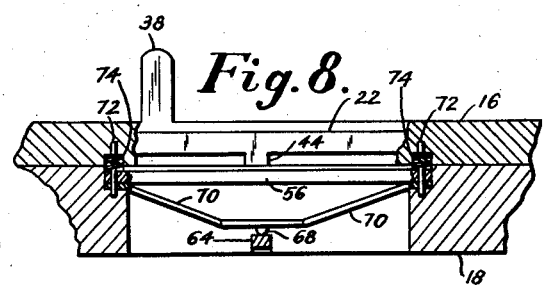
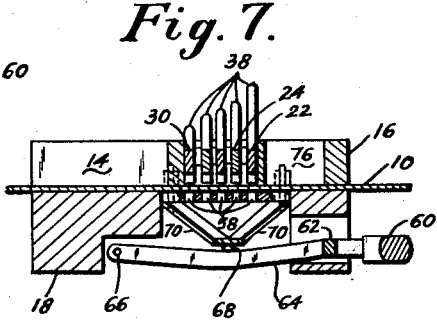
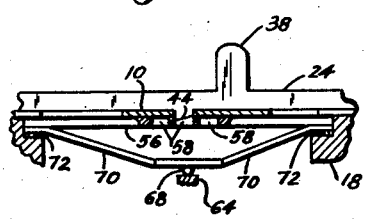

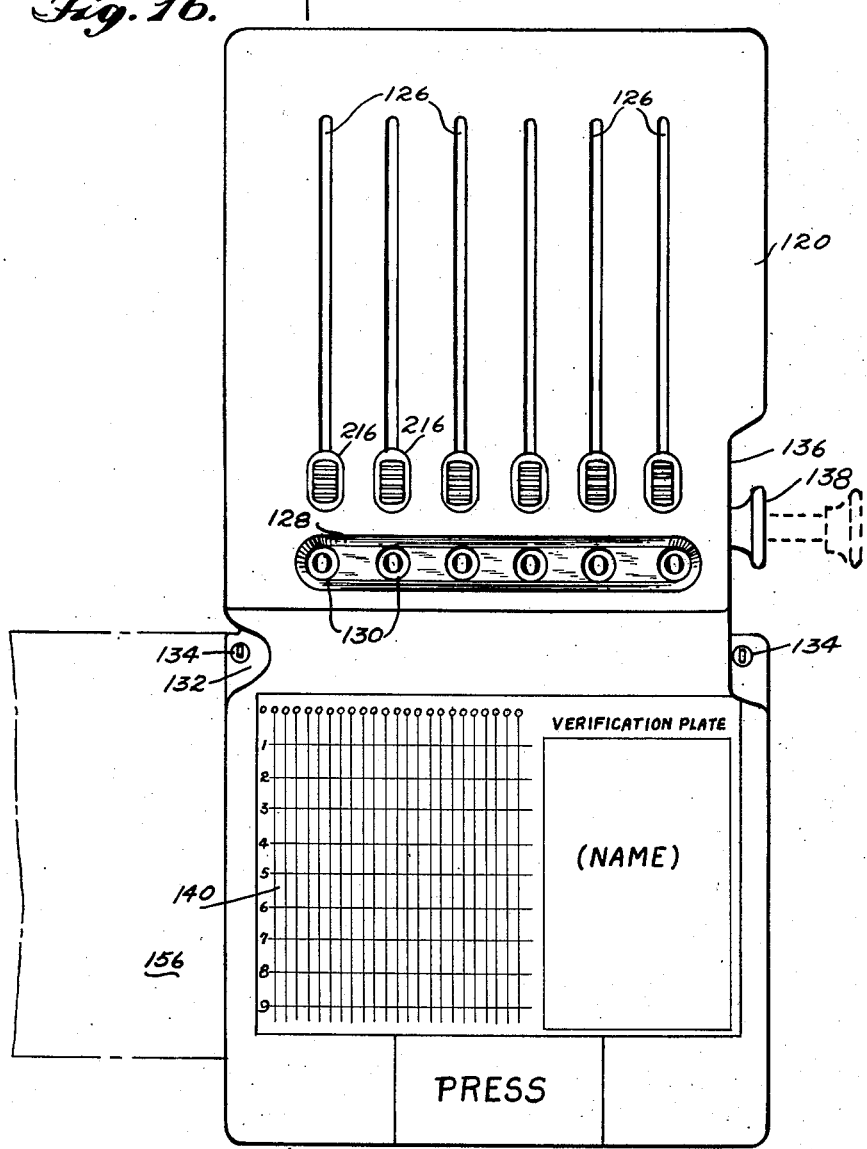
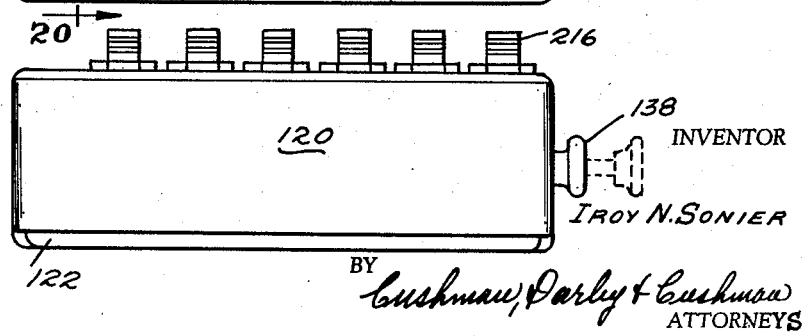

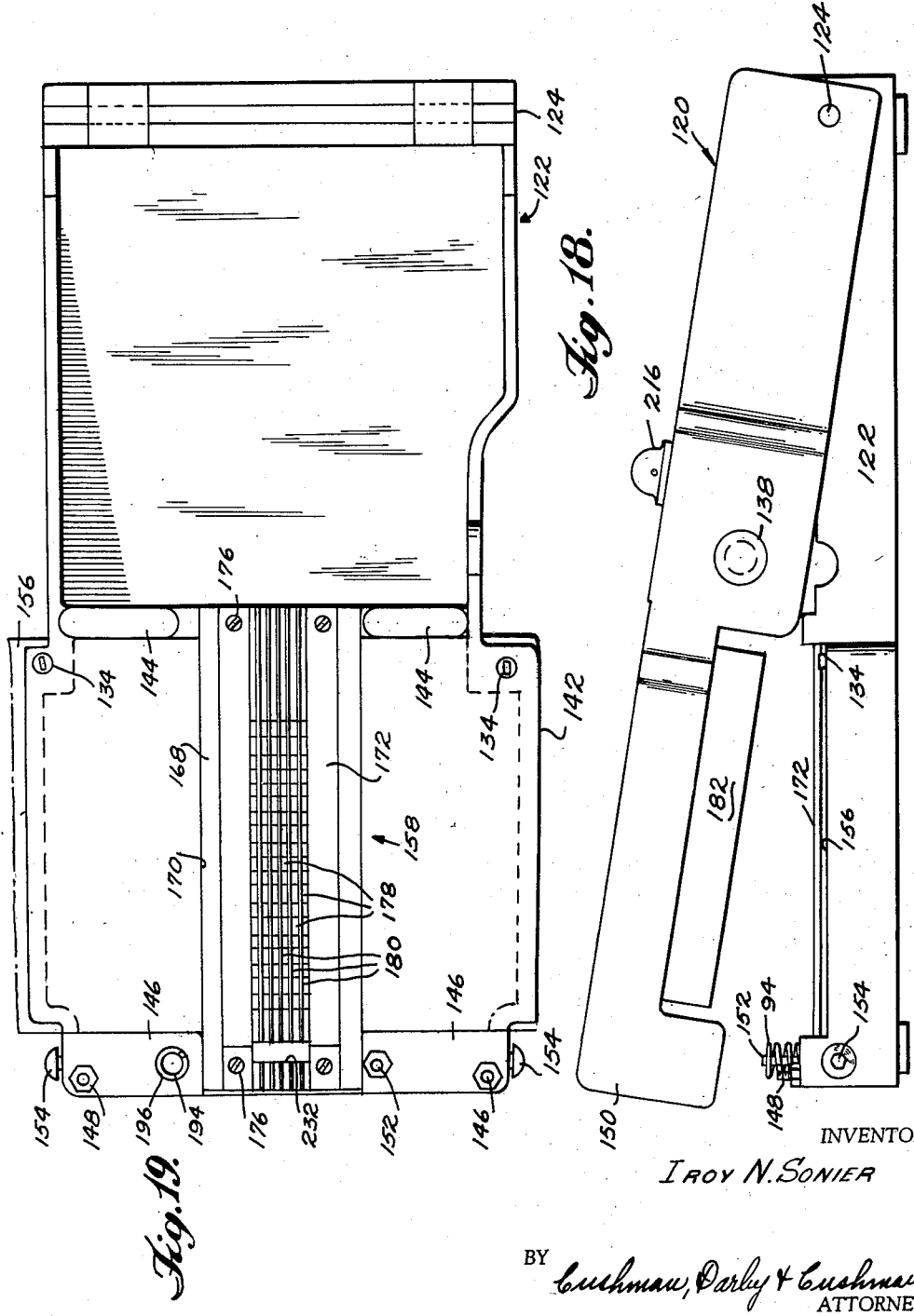

Nov. 17, 1959

I. N. SONIER 2,913,049

CARD PUNCHING DEVICE

Filed May 25, 1959

INVENTOR
IROY N. SONIER

BY Cushman, Darby & Cushman
ATTORNEYS

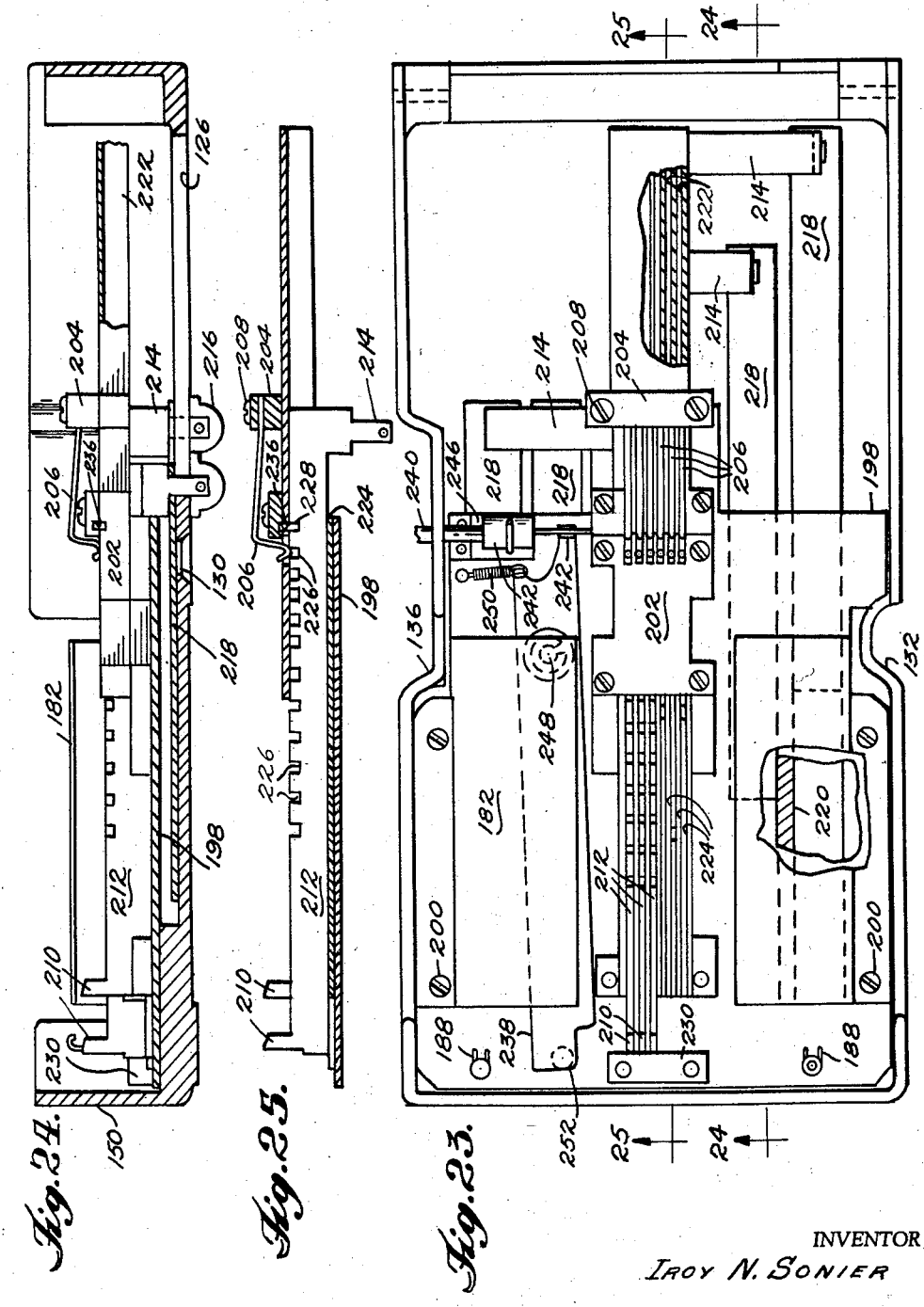

Nov. 17, 1959        I. N. SONIER        2,913,049
CARD PUNCHING DEVICE
Filed May 25, 1959        8 Sheets-Sheet 8
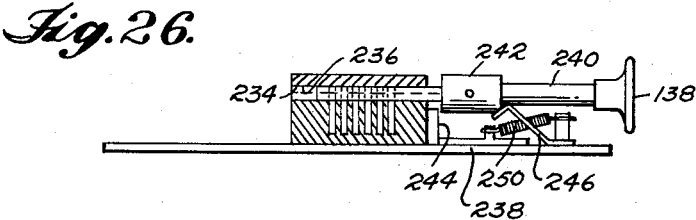
Fig. 26.
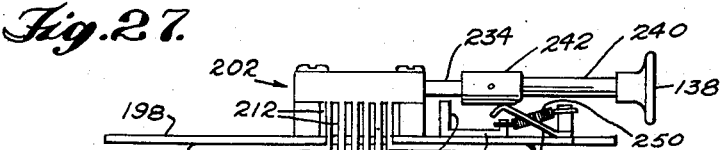
Fig. 27.
Fig. 28.
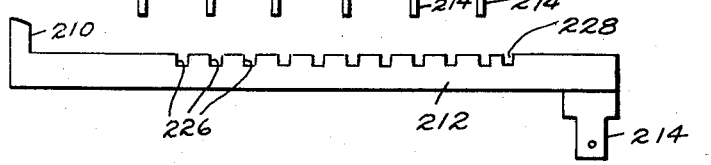
Fig. 29.
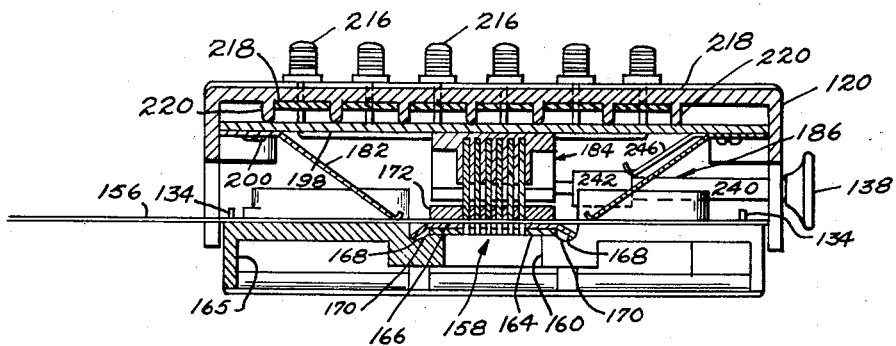
INVENTOR
IROY N. SONIER
BY *Cushman, Darby & Cushman*
ATTORNEYS

United States Patent Office 2,913,049
Patented Nov. 17, 1959

2,913,049

CARD PUNCHING DEVICE

Iroy N. Sonier, Somersworth, N.H., assignor to VIP, Inc., Dover, N.H., a corporation of New Hampshire Application May 25, 1959, Serial No. 815,727

28 Claims. (Cl. 164—111)

This invention relates to a punching device, and more particularly to such a device which may be employed to perforate cards or the like. Specifically, the device is intended for use with record cards, for example of the "IBM" type as popularly termed regardless of origin. No limitation is intended, however, to use of the device with a standard IBM card, or any other such type of card as for example the standard Remington Rand card, since the device may be employed to punch holes in any paper-like or card material, regardless of the dimensions thereof as long as the device is adapted to receive and cut such material.

This application is a continuation-in-part of my co-pending application, Serial No. 742,243, filed June 16, 1958, now abandoned.

Record cards of the IBM type or otherwise have become extremely popular as a means for storing information not only in a compact form but which may be conveniently read by mechanical, electrical or optical devices. Generally speaking, an aperture in such a card at a predetermined position therein refers to the storage of a given bit of information, while the absence of such an aperture in said predetermined position may mean that no information has been stored in that position of the card, or in combination with other apertured and/or apertureless areas in the card provides in a coded sense, an indication of the storage of a predetermined number of bits of information. One known way of making apertures in record cards is by the employment of an electric typewriter or the like to effect a desired coding in the form of a series of holes and no-holes which represent the information typed by an operator. Such a method of punching a record card in accordance with variable input information, or other similar methods, requires card punching machines which are comparatively bulky so as to preclude convenient carrying thereof by an operator. In addition, such machines are relatively expensive, particularly when compared to a device constructed in accordance with this invention.

It is therefore one of the objects of this invention to provide a card punching device which is inexpensive, small and simple relative to prior art devices.

Although the foregoing object is largely basic to this invention, it is to be understood that principles and concept of this invention may be expanded by design to provide a card punching device of a type which is comparatively large, more expensive, and more complicated, than that employed for illustration purposes herein. One of the reasons for illustrating only comparatively small, simple and inexpensive devices, is that one of the uses contemplated therefor is by utility meter readers. That is, the device may be sufficiently small and relatively simple in operation, and consequently comparatively inexpensive, so that a utility meter reader may carry it about with him, for example in his pocket, and quickly and easily operate the device to code a record card, which is otherwise individualized to the particular meter being read, in accordance with the respective dial readings of that meter. Besides such use, this device has numerous other applications including store inventory systems, sales-collection systems, payroll application systems, or any other system in which cards or the like need to be punched particularly for the storage of predetermined variable types of information.

In accomplishing the foregoing object, this invention contemplates a card punching device which includes a plurality of female cutting dies arranged in columns, and one male cutting die for each column. The male cutting dies are mounted so as to be movable along the length of the associated column of female cutting dies, and there is means for moving each of the male dies to at least an approximate registration position with any of the female cutting dies in the associated column. Further, the invention provides means for causing any male die which is in approximate registration with a female die, to be urged into substantially exact registration therewith. After each of the male dies is appropriately set, if necessary, relative to the female dies, in accordance with the information to be punched in a card, a lever or the like is actuated to cause relative movement between the male and female dies so that any male die in substantially exact registration with a female die may be mated therewith.

Alternatively, the lever actuator may be dispensed with by mounting the female die on a stationary support and mounting the male dies on a support hinged to the support of the female dies. The operator then need only depress the support carrying the male dies about the hinge in order to effect the mating of the dies.

As another feature of the invention, the means which urges the male dies from an approximate registration position into a substantially exact registration position, also operates to lock the male dies therein. This is a preferred feature since it assures greater accuracy upon relative movement between the male and female cutting dies. Additionally, the locking means may be employed to lock any one of the male dies in a position out of any possible registration with any female die.

Therefore, another object of the invention is the provision of a card punching device including a plurality of first dies arranged in columns, a second die for each column of first dies, means to effect substantially exact registration of any of the second dies with any of the first dies in the associated column therefor, means for causing relative movement between at least the first and second dies which are substantially in exact registration to effect mating therebetween so as to punch apertures in any card disposed between the first and second dies, means for moving each of the second dies at least to a position of approximate registration with any of the first dies in the associated column thereof, means for urging the second dies when so positioned to said substantially exact registration, means to lock the second dies at any given substantially exact registration position, or at a position completely out of any possible registration with any first die, and control means for permitting a locking operation of the means for locking the second dies at any substantially exact registration position while providing for the relative movement between the male and female dies for mating, and alternatively, for actuating the unlock of the second dies while simultaneously effectively preventing the dies from mating even though they be in an exact registration position.

In employing locking means for purposes as above set forth, there is also provided, in effect, means for unlocking any of the dies from any of their respective predetermined discrete positions. Generally, this takes the form of a lever which, in one embodiment, extends externally of the device and requires manual pressure to overcome the bias associated with the locking means.

As a further preferred feature, the device has an external lever, preferably a carrying handle, which may be operatively connected to engage only the unlocking means when moved in one direction, and when moved in another direction, engages only the die relative movement means so as to provide for effective operation thereof in mating the first and second dies which are in substantially exact registration.

A further embodiment of the locking device takes the form of a bar, pin or bayonet that moves transversely of the second dies to engage the dies to positively lock them in the determined punching position while at the same time the movement of the pin to a locking position moves a safety locking device to enable the dies to move relatively toward each other an amount sufficient to effect mating of any that are registered. A subsequent unlocking of the second dies by removing the pin causes the safety locking or blocking device to return to its original position so as to prevent the aforementioned relative movement.

It is therefore a further object of this invention to provide in a card punching device means for positively locking and positively unlocking the second dies in and from any of the possible registration positions relative to the first dies in the respective columns thereof.

Still a further object of this invention, in conjunction with the last object, is to provide means cooperating with the lock-unlock means for effectively preventing the dies from mating even though they may be in exact registration for mating while any second die is positively unlocked so as to be movable along its respective column of first dies.

Another object of the invention in conjunction with the foregoing objects is the provision of means for engaging either the unlocking means or the relative movement means to provide for possible actuation of only one of these means at a time.

Other features of the invention as well as other objects thereof will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

Figure 1 is a plan view of the device with a record type card inserted;

Figure 2 is a left side elevation view taken along line 2—2 of Figure 1;

Figure 3 is a right side elevation view;

Figure 4 is a cross-sectional view in part taken approximately along the line 4—4 of Figure 1;

Figure 5 is a cross-sectional view taken along line 5—5 of Figure 10;

Figure 6 is a plan view of the lower section of the device and is taken approximately along the line 6—6 of Figure 3;

Figure 7 is a partial longitudinal cross-sectional view taken along line 7—7 of Figure 1;

Figure 8 is a partial transverse cross-sectional view taken approximately along the line 8—8 of Figure 1;

Figure 9 is another partial longitudinal cross-sectional view taken along line 9—9 of Figure 1 and showing the device in its operated status;

Figure 10 shows a preferred configuration of adjacent male die cutting surfaces;

Figure 11 illustrates a modification of the indicia indicating apparatus;

Figure 12 is a cross-sectional view of a modification showing alternate operation by an external handle of the slide locking lever and template moving lever;

Figure 13 illustrates in partial cross-section another modification wherein the handle is stationary and a separate external lever is employed to operate alternately the slide locking and template moving levers;

Figure 14 is a cross-sectional view taken along line 14—14 of Figure 13;

Figure 15 is a partial plan view of Figure 13;

Figure 16 is a top plan view of the preferred device of the present invention;

Figure 17 is an end elevation view of the preferred device of the present invention;

Figure 18 is a right side elevation view of the preferred device of the present invention showing the top and base members in an unlatched position;

Figure 19 is a plan view of the base member of the preferred device of the present invention;

Figure 23 is a bottom plan view of the top member of the preferred device of the present invention, partially in section;

Figure 24 is a cross-sectional view taken along the line 24—24 of Figure 23;

Figure 25 is a partial cross-sectional view taken along line 25—25 of Figure 23;

Figure 26 is a side elevational view of the positive locking means of the preferred device of the present invention, partially in section;

Figure 27 is a side elevation view of the locking means and die slides of the preferred device of the present invention;

Figure 28 is a side elevation view of one of the male dies and integral slide of the preferred device of the present invention;

Figure 29 is a cross-sectional view taken along line 29—29 of Figure 20.

Figure 22:
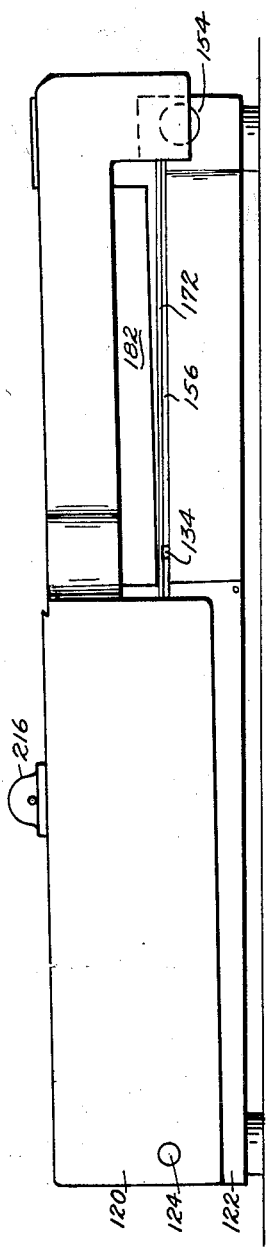
Figure 22 is a left side elevation view showing the device in a non-punching or normal position.

A card 10 which is to have apertures punched therein at positions predetermined in accordance with given input information, such as the respective dial readings of a utility meter, is shown in Figure 1 as being in position for ensuing punching by the device 12. The card rests in a well 14 notable in elevation in Figure 2. The well includes a squared, U-shaped cut-out portion in the upper section 16 of the punching device and further includes a shallow indentation which is approximately the depth of the card, in the base or lower section 18. Sections 16 and 18 may be releasably secured together in any desirable manner. Card 10 is positioned accurately in well 14, by disposing a pre-punched card aperture over stud 20 protruding from the bottom of the well. It will be noted that the widthwise dimension of the well is approximately the same as the width of card 10 so that the chance of the card skewing is substantially prevented. The card may have any number of apertures in longitudinal alignment with the one shown as fitting onto stud 20, and these apertures may be predetermined in position so as to be in alignment with any one of the different widthwise columns on the card, each such aperture corresponding to a different set of card positions or areas which are to be punched in accordance with variable information to be stored in the card.

As indicative of one column of predetermined positions or discrete areas on the card which may be punched by the device, there is indicated on the card in Figure 1 a column of numbers 0 through 9. This column, however, is not the one to be punched out when the card is positioned as shown in Figure 1, but the columns of discrete areas to be perforated on the card respectively under one or more of the five slides 22, 24, 26, 28 and 30. Each of these slides extend from a lower end 32 to an upper end 34, as viewed in Figure 1, and each is movable downwardly from their illustrated position. There is imprinted or otherwise disposed atop the length of each slide predetermined indicia respectively corresponding to the different possible bits of information in any order thereof, any one of which order bits may be stored in the card. Also, the variable information indicia on each slide respectively correspond to the indicia arbitrarily shown on the card, i.e., the numbers 0 through 9, but in reverse order to purposes which will become clear later. In addition, each slide has a further indicium denoted A, which, as shown in Figure 1, is viewable through window 36 when the corresponding slide is in its furthermost rearward or upward position as viewed in Figure 1. The indicium A when it appears in window 36 indicates the respective slide is in its normal resting position, and as will become apparent, all A's in window 36 further indicate that no perforating of the card can occur even if the mateable cutting dies later described are moved toward each other by accident or design. As any one of the slides 22 through 30 is moved downwardly, the respective numerals 0 through 9 progressively appear in window 36.

For purposes of moving the respective slides downwardly and back to their resting position, i.e., the position shown therefor in Figure 1, each of the slides has an uprising, preferably integral, knob or tab 38. As may be seen in Figures 2 and 3, these tabs are preferably of different heights and as Figure 1 shows, tabs 38 are staggered longitudinally when in their respective resting positions, all so that they may be more easily moved manually and independently of each other. It is to be noted that the slides are preferably slightly separated from each other and that movement of one does not cause movement of another.

For purposes of guiding the slides in their longitudinal movement so as to have as little sidewise movement as possible, each end of each of the slides is disposed to rest in a respective groove in a block, or upon a plate which has uprising separating runners. Such a plate is shown for the left or rear end of the slides, in Figure 4, as plate 40 with uprising slide separators 42. This may be seen in greater detail in Figure 5 which shows only two slides 22 and 24 for example. Plate 40 is connected to section 16 in any desirable manner as by the four screws 43 shown only in Figure 1. Plate 45 for the forward or lower end of the slides may be similar to plate 40.

Slides 22 through 30 are each equipped on their lower side as viewed in Figure 4 with a rectangular punch or male cutting die 44 preferably integrally formed therewith as shown, and also preferably of the same width as the slide. When the slides are in their most rearward position, all of the male cutting dies 44 are in alignment transversely of the slides. This may be noted in Figure 1 wherein each of the male dies 44 are shown in dotted lines.

In addition to the male cutting dies, each slide has on its rearward position a plurality of notches, each preferably of V-shape with a definite point, and are designated respectively in Figure 4 as notches 0 through 9. Further, each slide has another notch designated A. The designation of the notches for each slide is the same as the indicia atop each slide, and the notches for each slide are spaced apart the same respective distances as are the corresponding indicia on the slide. Cross arm 46 has an upper surface which is mateable with any one of the notches in any of the slides, and said upper surface is preferably also V-shaped with a definite point. Arm 46 extends transversely across all of the slides as may be noted by the dotted lines in Figure 1 and which is apparent from Figure 6. At its lower end, arm 46 is connected (Figure 4) to a lever 48 pivoted on the pin or rod 50. The lever extends externally of the lower section 18 and there connects to a knob 52 for manual operation of the lever 48 and arm 46. Spring 54 biases lever 48, and consequently arm 46, toward each of the slides. Whenever arm 46 is mating with any set of notches, i.e., one notch of each of the slides, the slides are locked in place. Arm 46 therefore acts as a releasable locking means when used in conjunction with bias means such as spring 54. Manual movement of knob 52 upwardly as viewed in Figure 4 causes unlocking of all the slides by pivoting lever 48 so as to move arm 46 downwardly against the bias of spring 54. As long as the bias of spring 54 is sufficiently overcome so as to lower the point of arm 46 below the lower planar surfaces of the slides (which cannot be accomplished by any attempt to move the slides longitudinally as by respective knobs 38), unlocking by lever 48 is accomplished and any one of the slides can be moved longitudinally.

Upon moving any one or more of the slides so that one of the 0 through 9 notches of the moved slides are at least approximately disposed over arm 46, the manual release of knob 52 allows spring 54 to bias the pointed surface of arm 46 fully into each notch in the resulting row of notches so as to lock all the slides in a given position. That is, even though a notch is not exactly in register with arm 46, the point thereof will land at least on the side of such a notch and urge the slide with that notch, and any other slides with notches, similarly disposed, slightly in the appropriate direction so as to cause perfect seating of the point of arm 46 with the point of one notch in each slide. The notches in which the pointed surface of arm 46 is so seated or mated are then consequently in substantially exact transverse alignment and are releasably there locked. It is to be understood that not all of the slides need be moved, nor do the moved slides need to be positioned so that corresponding notches of each are in transverse alignment, for locking of all the slides to occur in unison. Instead, after movement of one or more of the slides to a position which causes representation in window 36 (Figures 1 and 4) of the desired respective indicia (say A2739 as a representative example), a row of notches (the A notch of slide 30, 2 notch of slide 28, 7 notch of slide 26, 3 notch of slide 24, 9 notch of slide 22, as per the example) will be in at least substantial transverse alignment for mating by the pointed surface of arm 46.

It is to be noted that when the A notch of any slide is mated with the surface of arm 46, not only will the indicium A on that slide show through window 36 but also that slide will be locked in its rearward-most position so that its male die 44 is back beyond the edge of card 10 and also out of any possible registration with any female die 58. This non-registering position prevents "floating" of any slide and accidental punching of incorrect information into the card.

When arm 46 has its pointed surface mating with one of the 0 through 9 notches of each slide, all the respective male cutting dies 44 are then substantially in exact registration with the female cutting dies in template 56 (Figure 6) which is disposed in the lower section 18 with its upper surface flush with the bottom of well 14. Template 56 includes as the female cutting dies, a plurality of apertures 58 arranged in columns with each column having the same number of apertures as the number of positions on card 10 which may be punched by the associated male die. The corresponding apertures in each column thereof are in transverse alignment the same as are the indicia atop each of the slides shown in Figure 1. The upper openings of apertures 58 all lie in a given plane which is flush with the template surface upon which card 10 lies flat, as is shown in Figure 7.

To cause mating between the male cutting dies 44 and the female cutting dies 58, when same are in substantially exact registration, lever 60, which may also preferably suffice as a carrying handle, is moved in a direction toward the viewer of Figure 6, i.e., upwardly in Figure 7. As shown in Figure 7, and in dotted lines in Figure 6, handle 60 connects via arms 62 to lever 64 which is pivoted, for example, at its opposite end, on pin 66. It will be noted that lever 64 is slightly curved and at its central portion engages bearing 68 which is centrally disposed of template 56. This bearing is formed on the bottom of a caging which includes four struts 70 respectively sloping from the corners of template 56 toward the bearing whereat the intersectional area of the struts may be a flat, plate-like structure, as shown in Figure 6, if desired. Each strut at its template corner is held in place by a pin or rod 72 which is secured in lower section 18. These rods also extend respectively through an aperture in a different corner of template 56, and further extend upwardly into the upper section 16, as shown in Figure 8. Between the upper surface of template 56 and a counterbore in upper section 16 about each of pins 72, are springs 74 which in combination, operate to bias template 56 downwardly and away from the male cutting dies 44. The template apertures through which pins 72 respectively pass are closely dimensioned to the pins to prevent substantially any movement of the template in any direction lying in the plane of the template. However, by virtue of the guiding pins 72, template 56 can move in an up and down direction as viewed in Figure 8. Therefore, when handle 60 of Figure 7 is moved upwardly, template 56 is caused to move upwardly, and not in any sidewise direction, by the camming action between lever 64 and bearing 68, so as to provide relative movement between every female cutting die and every male cutting die and effect mating of all female and male dies which have previously been locked into substantially exact registration as aforedescribed.

Figure 9 illustrates male die 44 as associated with slide 24 in mating position with a female die 58 following perforation of card 10 by the male die. Upon release of handle 60, springs 74 push template 56 downwardly and the punched card normally follows the template in its downward movement. However, if it does not so follow, the card may be removed from the male cutting dies by slight finger pressure directed onto the card through the large opening 76 (Figure 1) and well 14. The card may then be moved longitudinally for punching another set of column areas, or removed (and stored in any conventional manner if desired) for immediate or later mechanical, optical, or electrical reading of the information stored therein by the punching operation.

Although the male cutting dies 44 as shown in Figures 4 and 8 may be flat at their cutting edges or surface, or of any other desired shape, they are preferably cut on the bias as shown in Figure 9. Additionally, adjacent male dies are preferably cut on the bias in opposite directions to each other. This is shown in greater detail in Figure 10 in which two adjacent male cutting dies 44a and 44b are illustrated in alignment with each other, i.e., in transverse alignment relative to the length of the slides. These two male dies may be associated with two adjacent slides such as slides 22 and 24 for example. When the two dies 44a and 44b are in crosswise alignment and substantially in exact registration with the respective female cutting dies 58 in the associated columns thereof, relative movement between the male and female dies causes opposite ends of the card areas to be cut thereby, to be contacted first and then there is provided a desirable scissor-like cutting action on the two card areas as between the respective male and female dies. This prevents the small card area between apertures so punched from being torn or damaged during the punching process. It is to be noted that the respective cutting surface or edges 76 and 78 slope in generally opposing directions from a plane 80 touching the point of each male die and that the slopes thereof are both away from not only plane 80, but also the closest parallel plane in which the female cutting dies lie, i.e., the upper surface of template 56 on which card 10 rests. In other words, the cutting edges 76 and 78 each form acute angles relative to plane 80 when such angles are measured in opposite angular directions therefrom, or form acute and obtuse angles, respectively, relative to the respective corresponding sides of the two dies. That is, relative to sides 82 of the two dies, cutting edge 76 forms an obtuse angle while cutting edge 78 forms an acute angle.

Although the male and female dies have each been illustrated as rectangular in cross-section, no limitation thereto is intended since it is to be understood that they may be instead square, circular or of any other desired cross-sectional configuration.

As modifications of the previously described embodiment wherein window 36 of Figure 1 is employed along with indicia disposed atop the slides, numerous other ways may be employed to indicate the approximate registration of any one male die with one of the associated column female dies. Figure 11 illustrates a modification for accomplishing this by providing a rack and gear arrangement plus an indiciaized disc for each slide. Only one such arrangement is shown in Figure 11 and this includes rack teeth 84 on the bottom of slide 86. These teeth operate gear 88 which is secured to a rotatable disc 90. About the periphery of disc 90 may be disposed indicia A and 0 through 9, any given one of which indicia may be viewed through window 92 upon rotation of the disc so as to position the given indicium adjacent the window opening. In this embodiment and in the aforementioned embodiment as well as any other similar embodiments, hairlines may be used if desired for greater initial accuracy, but such is totally unnecessary since the pointed surface of arm 46 (Figure 4) in conjunction with the slide notches provide all the accuracy necessary.

Further modifications of the device include designing the punch slides without the knobs or tabs 38 but instead with indentations (not shown, but located similarly as tabs 38) which respectively can receive the point of a pencil or a small pin for independently moving the slides. Also, the punching slides may be separately operated by respective indirect mechanisms, for example cog wheels, for independent movement to desired positions. Further, each slide may be biased to move from its resting position forwardly and have a ratchet-type design including sawtooth notches, instead of the V-shaped notches, and then be operated by an electromagnet cooperating with the ratchet in such a manner as to allow any one slide to move only one digit position at a time in response to an electrical impulse derived for example from depression of a push button.

As a further modification, and in reference to Figure 7, it is to be understood that lever 64 need not be directly connected for manual operation, but may also include other mechanical linkages for indirect action whereby the handle is moved downwardly to effect relative motion between the male and female dies, or may be moved in any other direction to effect same. Additionally, lever 64 may be electrically operated as by a solenoid coupled to electrical impulses arriving at desired punching times.

Of course, the concept of this invention encompasses more or less than five slides and associated male dies and columns of female dies, as well as more or less than ten possible discrete input information positions for each male die, no limitation to any particular number of male dies or registrable positions therefor being intended.

Although it has been mentioned above that template or die set 56 moves up and down on pins 72, whenever handle 60 is actuated, it is also contemplated in another embodiment that not only the template itself may move to effect mating between the dies, but that in conjunction therewith the base or lower section 18 in which the template is then relatively immovably set may be made to move in unison with the template or die set to effect the desired mating. Alternatively, the template or die set may be held stationary while the male cutting dies are pressed individually or in unison to cause the punching operation. Further, the whole upper section 16 including the punching slides may be movable relative to the template or die set and lower section 18 so as to effect the desired mating between the punches and respective apertures after the slides are appropriately set. In any case, there is always relative movement effected between the male and female dies.

As a preferred feature, the carrying handle is positioned at one end of the device, and preferably the same end to which the slide locking lever 48 extends. In this embodiment as shown in Figure 12, the template or die set moving lever 64' is changed to run longitudinally of the device rather than transversely thereof. Lever 64' may be two spaced parallel arms (not shown) pivoted about their length and having a crosspiece which provides the riding surface for a bearing like bearing 68 of Figure 7. At their end which is adjacent the extension of the locking lever 48, such arms may come together and extend externally of the device with slide locking lever 48 extending therebetween. By suitable single actuating means, comprising carrying handle 102 for example, the template or die set moving and locking levers may be engaged independently and alternately so that neither can be operated by the handle while the other is engaged for actuation. Rather than such parallel arms being in combination with the template or die set moving lever, the lewer preferably is a single arm 64' as shown in Figure 12.

In Figure 12, template or die set moving lever 64' is pivoted on rod 92 disposed toward its central portion, rather than at its end as is the case for the corresponding lever in Figure 7. Toward its right end as viewed in Figure 12, lever 64' is biased by spring 94 so as to tend to pivot the lever in a clockwise direction. Stud 96 is pivoted at point 98 to the lever, and the upper end of stud 96 rests against the bottom of template or die set 56, thereby causing the template or die set to move upwardly when lever 64' is rotated in a counterclockwise direction. This arrangement eliminates the struts 70 illustrated in Figures 6, 7, 8 and 9, but does not eliminate guide pins 72 (not shown in Figure 12, but see Figure 8 for example). Therefore, template or die set 56 still may move only in an up and down direction as viewed in Figure 12. Lever 64' extends from pivot rod 92 toward the left end of the device and is substantially directly under the slide locking lever 48'. This lever may be exactly like its counterpart, lever 48 of Figure 4 for example, except that it does not extend externally of the device. Lever 48' is also biased by spring 54 but instead of the spring being disposed beneath and to the right of pivot rod 50 as previously described, it is disposed above and to the left thereof between lever 48' and a counterbore in plate 40. The left ends of levers 48' and 64' in Figure 12 have interposed between them the inward extension 100 of a T-shaped carrying handle 102 including shank 103 which is pivoted about pin 104. When handle 102 is depressed so as to cause counterclockwise rotation of shank 103, its inward end 100 pushes against lever 48' and the bias of spring 54 so as to effect unlocking of the slides as previously described. Because of the cammed configuration of the lower side of end part 100, which may be termed a cam, lever 64' is not engaged or bothered in the least by counterclockwise rotation of shank 103, thereby effectively preventing upward or mating type movement of template 56 by cam 100 while the cam is causing the slides to be unlocked. Alternatively, handle 102 may be moved upwardly as viewed in Figure 12 so as to cause clockwise rotation of its shank 103. The interior end part 100 then engages template or die set moving lever 64' and then causes the latter to rotate about pin 92 in a counterclockwise direction, thereby moving template or die set 56 upwardly. Such clockwise rotation of shank 103, due to the upper cammed surface of end part 100, does not cause engagement thereof with, or operation of, locking lever 48. Preferably cam 100 is slightly off center or eccentric relative to the center line of shank 103, so as to compensate at least somewhat, for the otherwise unequal angular movements of shank 103 up and down as caused by the difference in leverage and necessary operational travel for arm 46 and stud 96.

As a further modification, the handle may be stationarily disposed on the end of the device as shown in Figures 13 and 14, while levers 48' and 64' are independently and alternately operated by cam 106 which is secured to shaft 108. The shaft otherwise rides in bearings 110 and 112, and further extends externally to a side of the device at which point it is connected to an operating lever 114. In operation, lever 114 when at its neutral position so designated in Figure 15, causes cam 106 to be in the position illustrated in full lines in Figure 14. When lever 114 as viewed in Figure 15 is rotated counterclockwise, cam 106 engages template or die set moving lever 64' and causes operation thereof as aforedescribed, and without any engagement or operation of the slide locking lever 48'. Alternatively, rotation of lever 114 in a clockwise direction as viewed in Figure 15, causes cam 106 to engage and operate locking lever 48' without engagement or operation of template moving lever 64'.

It is therefore apparent that cam 100 of Figure 12 and cam 106 of Figure 14 actuates the levers 48' and 64' mutually exclusively so as to cause mutual exclusive slide unlocking and punching operations, thereby effectively preventing mating of any registered dies while the slides are unlocked, or alternatively, effectively preventing longitudinal movement of the slides while die mating occurs.

Figure 21:
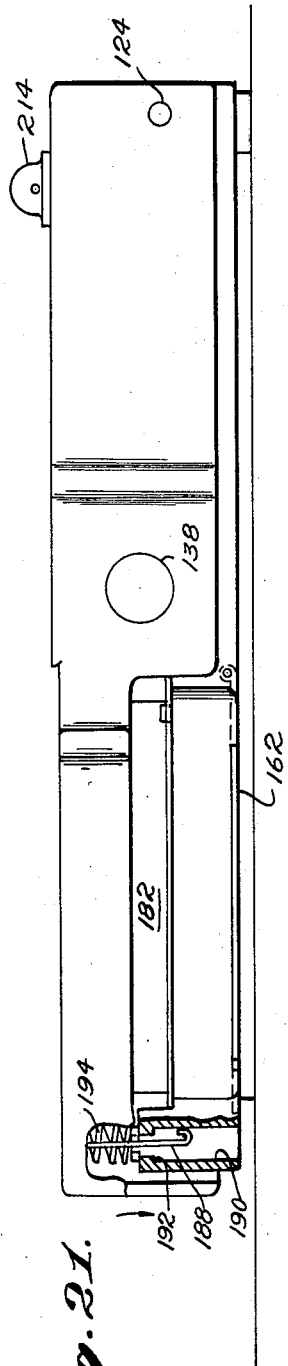
Figure 21 is a right side elevation view showing the device in a punching position.

The preferred card punching device of the present invention, illustrated in Figures 16 through 29, comprises a substantially rectangular top member 120 of metal or plastic, and a base member 122 connected to the upper end of the top member as by hinge pin 124 or the like. Base member 122 is somewhat smaller in dimension than the top member 120 so as to fit within the sides of the top member when the device is in a normal position (Fig. 22) or in a cutting position (Fig. 21).

A series of parallel slots 126 are disposed within the rearward portion of top member 120 and extend longitudinally from the upper most portion to the middle of the top member. A transverse groove 128 having a plurality of equally spaced apertures 130 therein is located adjacent the lower end of the slots 126, and the apertures are spaced so as to be in exact alignment with the slots 126. The purpose of the parallel slots and the apertures in the transverse grooves will be discussed more fully below.

The left-hand side of top member 120 is recessed substantially at the midpoint thereof at 132 in order to provide for visual access to a card locating pin 134 disposed within the base member. The right hand side of top member 120 has an elongated recess 136 disposed substantially at its midpoint in order to receive knob 138 of the control means. The knob 138 shown in full in Figures 16 and 17 is substantially within the recess 136 when the control device is in a die locking position and the punch is in an operation position. The recess 136 also provides for ready access to the knob 138 so that the operator may unlock the dies by pulling the knob to the right.

A verification plate 140 is disposed on the upper surface of top member 120 at the forward portion thereof in order for the operator to verify the positions punched on each card with the desired settings of the dies of the present invention. The verification plate 140 has printed upon its surface a plurality of rows of figures corresponding to the desired information placed upon each card. Preferably, the numbers on the verification plate comprise a series of rows of figures starting from zero at the top to 9 at the bottom, each of the rows having the same number of figures. After the operator has punched the desired portions from each card, the card is then placed upon the verification plate so that the numbers on the verification plate will appear in the portions punched from the card in order that the operator may readily compare the numbers desired to be punched with the punched apertures of each card.

As shown in Figure 19, the forward portion 142 of base member 122 is provided with card guide elements 144 at the uppermost portion thereof and is similarly provided with card positioning guides 146 at the lowermost portion thereof. Stop members 148 are disposed within the lower card guides 146 and extend upwardly therefrom so as to restrict the relative movement between the unhinged end 150 of top member 120 with respect to base member 122. The stud 152 extending upwardly from the lower card guide 146 is adapted to cooperate with the control means so as to permit or prevent any relative movement between the top end base members as will be described in detail below.

Adjustable studs 154 are located on either side of the lower end of base member 122 in order to properly adjust the base member with respect to the top member and properly align the associated dies carried by each.

Card locating pins 134 are disposed adjacent the upper card guides 144 of base member 122 to properly position the card 156 to be punched with respect to the associated dies of the present invention. The pins may either be fixedly secured to the base member or mounted so as to be retractable within the base member when the device is not in use or when it is desired to shift the card from one punching position to another. The card 156 is provided with a notch or notches adapted to cooperate with the locating pins 134 to accomplish the proper positioning for punching.

Disposed centrally within the forward portion 142 of base member 122 and extending parallel to the sides thereof, is a first set of apertures or cutting dies 158 adapted to cooperate with a second set of male cutting dies mounted on the top member as later described.

Figure 20:
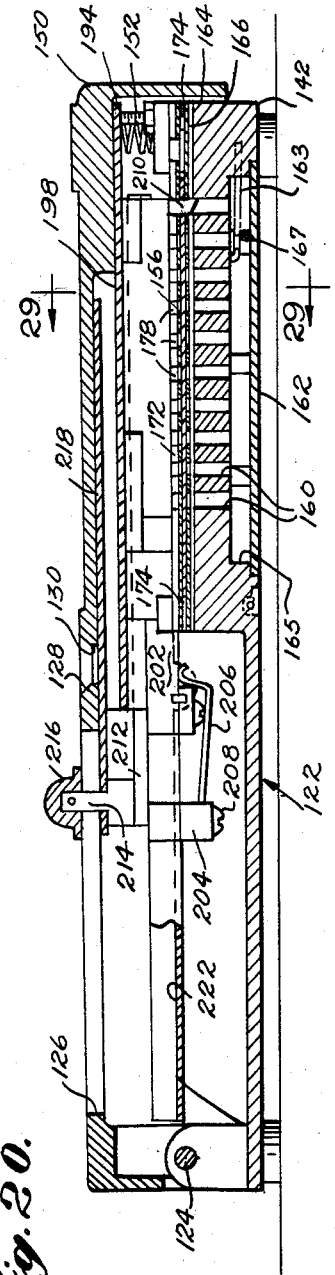
Figure 20 is a cross-sectional view taken along line 20—20 of Figure 16.

Referring to Figures 19, 20 and 29, the first set of female cutting dies 158 is disposed above a plurality of apertures 160 within the base element 122. Beneath the apertures 160 of the base portion, is a hinged plate 162 which serves as a receptacle for the portions punched from each card. Spring fingers 163 extending from the forward portion of the base member 122 toward the rearward portion thereof within the recess 165 of the base member are adapted to engage detents 167 secured to the hinged plate 162 to retain the plate in a closed position. After a suitable period of use, the operator need only pull downwardly on any exposed edge of the hinged plate to release the studs from the spring fingers to remove the punched portions received by the plate.

The first set of cutting dies comprise a backing member 164 which is mounted upon base member 122 and a spring steel cutting die plate 166 supported by the backing plate. The spring steel cutting die plate 166 is provided with longitudinally extending and downwardly diverging portions 168 which fit into the longitudinal grooves 170 of base member 122 to reinforce or stiffen the cutting plate during the de-mating part of the cutting operation, i.e., during the removal of any male die (later described) from a cutting plate die aperture. A stripper plate 172 is disposed directly above the cutting die plate 166 and is spaced apart therefrom as by the washers 174 or the like to provide for the insertion of the card 156 to be punched between the cutting plate and the stripper plate. The backing plate, cutting plate, spacing washers and stripper plate are secured to the base member as by the studs 176 located at each corner. Each of the aforementioned elements of the first set of cutting dies is provided with a series of columns of die apertures 178, preferably ten in number, there being preferably six of said columns of die apertures. The apertures of each element are in exact alignment with the apertures of each of the other elements so as to provide a single cutting die for each aperture. A series of integral ribs 180 extend upwardly and longitudinally along the stripper plate are disposed between each of the columns of dies and serve as guides to prevent any lateral movement of the second dies relative to the first dies as they move along a column of the first set of dies. Preferably, the stripper plate is made of a different metal than that of the second dies so as to reduce the possibility of bonding between any second die and the stripper plate as the second dies move therealong.

Disposed within the top member 120 are card tension guides 182, the second set of dies and associated guides, indicated generally as 184, and the control mechanism indicated generally as 186. The card tension device comprises spring steel members 182 secured to the forward portion of the underside of top member 120 and extend downwardly and inwardly therefrom. As shown in Figure 29, the card tension devices are adapted to press against the card to be punched on either side of the mating dies to maintain the card in a substantially horizontal position and to prevent any buckling of the card during the punching operation.

Spring latch members 188 (Fig. 21) are secured to the forward portion of the underside of top member 120 and depend downwardly therefrom. The spring members are adapted to be received within the apertures 190 in the base member 122 and engage the shoulder 192 of the apertures to secure the unhinged end of top member 150 to the unhinged member of base member 122. The spring latches 188 are adapted to slide downwardly within the apertures 190 during the punching operation and also serve to limit the upward relative movement of the top member 120 with respect to the base member 122 by the engagement of the springs 188 with the shoulder 192 of the apertures 190. In a non-cutting or normal position, the top member 120 is urged upwardly with respect to base member 122 through the action of coil spring 194, the lower end of which is disposed within aperture 196 of the base member and the upper end of which is in engagement with the underside of the top member 120.

Referring to Figs. 23, 24 and 25, the second set of dies and associated slides and upper guides are carried by the mounting plate 198 which is secured to the underside of the forward position of the top member 120 as by the studs 200 or the like. These same studs also serve to secure the card tension devices 182 mentioned above. A die slide guide block 202 is disposed centrally to the underside of top member 120 and extends longitudinally therein. Detent block 204 carrying a plurality of detent springs 206 is secured to the die slide guide lock 204 as by the studs 208.

The second set of dies comprises a plurality of male cutting dies 210 preferably six in number integrally formed with the notched die slides 212. The die slides are adapted to slide within the die slide guide block 204 to mate with any die in each column of first guides disposed within base member 122. As shown in Figure 27 an angled die slide extension 214 is secured to the rearward end of each of the die slides 212. The upper portion of the angled die slide extensions are adapted to be received by the parallel slots 126 of the top member 120 and extend therethrough. Knobs or buttons 216 are suitably secured to the uppermost portion of the angled die slides extensions 214 and slidably engage the upper surface of top member 120. A longitudinally extending slide strip 218 is secured to the upper portion of the angled extensions 214 of the die slides and is adapted to slide along the underside of top member 120 is provide additional guide means for the die slides. The slide plates are guided by longitudinally and downwardly extending projections 220 of top member 120 as shown in Figure 29. The die slide guide block 202 is provided at its rearward end with a plurality of longitudinally extending grooves 222 within which slide the die slides 212. The forward end of the die slide guide block 202 is similarly provided with a plurality of longtiudinally extending grooves 224 within which slide the die slides 212 and cutting die 210 as the dies are moved toward an exact registration position with respect to the first set of dies. Preferably the die slides and cutting die are made of steel whereas the entire die slide guide block is made of brass. The reason for the die slides and die slide guides being of different metals is to reduce the possibility of bonding or binding of the slides and the guides as the slides move along the guides.

As previously mentioned, detent block 204 having a plurality of detent springs 206 is secured to the die slide guide block (Fig. 25). The detent springs 206 are adapted to cooperate with any of the notches 226 of the die slides 212 in order to place the associated cutting die 210 of each slide 212 substantially in any exact registration position with any of the cutting dies 178 disposed within an associated column of first cutting dies in base member 122. Preferably there are 11 of the notches 226 in each slide, one for each number of dies 178 in each column of the first set of dies and an additional notch 228 corresponding to an "out of alignment position." When the dies are in an "out of alignment position" each of the second set of dies is in engagement with stop member 230 secured to mounting plate 198 and are in alignment with the corresponding out of registration aperture 232 (Fig. 19) of the first set of dies 158. When the dies are in an out of registration position if the operator inadvertently attempts to punch a card positioned within the base member, no registration will appear upon the card in view of the fact that the out of registration position aperture of the first set of dies is beyond the lower edge of the card.

The control mechanism (Figs. 26 and 27) indicated generally as 186 includes a locking pin or blade 234 which is adapted to slide within longitudinal slot 236 of the die slide guide block, and a safety interlock lever 238. The slot 236 is so positioned that when the detent spring 206 are in engagement with any notch in each of the die slides, the blade 234 will be able to move transversely within the slot 236 and positively lock each of the die slides in its exact registration position by engaging the notch 226 in the slide immediately adjacent to the notch engaged by the detent springs. The locking pin or blade 234 is provided with a knob 138 secured to extension 240 of the pin which extends through the side of the top member 120. An enlarged shoulder portion 242 secured to extension 240 of the pin 234 limits the outward motion of the pin 234 relative to the die slide guide block, and is also adapted upon inward motion of the locking pin to engage detent 244 of the pivoted safety interlock lever or blocking plate 238. During the locking operation, as the pin 234 moves inwardly to lock the die slides in any exact registration position, shoulder 242 rides over the pressure spring 246 and the forward end of the shoulder engages detent 244. Continual inward motion of the pin 234 and shoulder 242, through the action of the detent 244, causes the blocking plate 238 to pivot about its pivot 248 against the spring 250 so that the forward end uncovers the aperture 252 at the forward end of the top member 120 only when all slides are locked. The spring 250 urges the blocking lever 238 back to its blocking position upon disengagement of the shoulder 242 of the pin 234 from the detent 244 which is as soon as the pin unlocks the first (lowermost in Figure 23) slide.

It will be readily seen that when all of the second dies are locked in any of their respective detented positions and aperture 252 in the top member is uncovered, the device is ready to punch any number of cards as the stud 152 may now fit into the aperture 252 upon sufficient relative movement between the top member 120 and base member 122 to effect die mating. On the other hand, when any one of the male dies is unlocked, aperture 252 is at least partially blocked so that stud 152 cannot be received thereby. The male dies are thereby protected from damage by inadvertent relative movement of the top and base members 120, 122 toward each other since such relative movement cannot then be sufficient to cause any male die to enter any die aperture even in the stripper plate 172 or to touch any surface area between the stripper plate die apertures.

In normal operation of the preferred form of card punching device the operator first inserts a card 156 within the device between the stripper plate 172 and cutting blade 166 of the first set of dies. The card is properly aligned with respect to the dies by registering the locating apertures of the card with the locating pins 134 disposed within the base member 122 of the punching device. The control means 186 is then moved to the right so as to unlock each of the second set of dies and to restore the blocking plate 238 to its normal position to prevent any mating between the dies through action of spring 230. Each of the second dies 210 is then moved to the desired exact registration position by means of the knobs 216 disposed upon the rearward end of the top member. The slide guides 218 attached to each of the second set of dies carries a plurality of numbers thereon corresponding with the location of the second die with respect to the first die. These numbers appear within the apertures 130 of the transverse groove 128 disposed adjacent the lower end of each of the slots 126 in the top member so that the operator may see that each of the dies is in the desired position with respect to the first set of dies. When each of the second dies is in the desired exact registration position, the control means 186 is moved to the left to lock each of the dies positively in the desired exact registration position while simultaneously pivoting the blocking lever 238 about its pivot 248 to uncover the aperture 252 to allow then, and only then, sufficient relative movement between the top member and the base member to occur to effect male-female die mating, as previously described. With the card 156 in place and the dies locked in the desired exact registration positions, the operator then depresses the top member by pushing upon the forward end thereof in order to mate the dies and punch out the desired portions from the card. After the punching operation the coil spring 194 urges the top member back to its normal position with respect to the base member and the operator may then remove the card from its punching position and verify the punched portions against a verification plate 140 as previously described. The operator may then re-insert the card for an additional punching operation, or later, insert a new card into the punch. With the new card in place the operator then repeats the steps above for each card that is to be punched.

Thus it is apparent that there is provided by this invention a device in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings being interpreted as illustrative and not limitative, the scope of the invention being defined in the appended claims.

I claim:

1. A card punching device including a set of first dies arranged in columns in a given plane, each column having a predetermined number of said dies, a set of second dies disposed in a second plane substantially parallel to and spaced from said given plane, each of said second dies cooperating with one of said columns of first dies and providing a mate therefor, means for independently moving each of said second dies in said second plane along its cooperating column of first dies to exact registration with any one of said first dies, said means comprising a plurality of slides, each having a plurality of notches and being formed integrally with said second dies respectively, and adapted for sliding motion relative to said columns of first dies, means for guiding said slides to prevent lateral movement relative to said columns of first dies, and control means comprising a pin movable transversely of said slides and said guide means to engage a notch at least in said slides to lock the slides and the associated dies in any exact registration position or to unlock the slides, a spring biased pivoted lever normally disposed in a blocking position to prevent any mating between any first and second die, one end of said lever being provided with a detent which cooperates with said pin to pivot said lever out of its blocking position when said pin locks said second dies in exact registration position, to allow for relative movement between said first and second dies for mating, said lever returning to its normal blocking position upon the unlocking of any of said second dies by said pin.

2. In a card punching device, a stripper plate having a plurality of columns of die apertures and ribs disposed longitudinally between said columns, a cutting plate disposed beneath said stripper plate and having a like plurality of die apertures in exact alignment with the die apertures of said stripper plate, means separating said cutting plate from said stripper plate to allow for the passage of a card therebetween, a backing plate disposed beneath said cutting plate and having a plurality of columns of die apertures in exact alignment with the die apertures of said cutting and stripper plates, and a plurality of male cutting dies respectively slidable between said ribs of the stripper plate and independently movable in a plane above the die apertures of the stripper plate to a registration position with any of the die apertures in the stripper plate, said ribs acting as a guide at all times for the male dies to prevent lateral movement thereof.

3. A device as in claim 2 wherein said cutting plate has a thickness approximating that of a razor blade and is flat throughout its length and throughout its breadth to a predetermined distance from the outer edges of the outer columns of its die apertures whereat it has two sloping sides which diverge from the flat part of the plate to aid in maintaining the flat part flat during the removal of any male die from a die aperture of the cutting plate.

4. A card punching device including a set of first dies arranged in columns in a given plane, each column having a predetermined number of said dies, a set of second dies disposed in a second plane substantially parallel to and spaced from said given plane, each of said second dies cooperating with one of said columns of first dies and providing a mate therefor, means for independently moving each of said second dies in said second plane along its cooperating column of first dies, said means comprising notched slides formed integrally with each of said second dies and adapted for sliding motion relative to said columns of first dies, means for effectively guiding said second dies to prevent lateral movement thereof relative to said columns of first dies, said guide means including integral ribs disposed longitudinally between said columns of first dies and adapted to slidingly engage said second dies as they move along said columns of first dies, means cooperating with said notched slides for locking said second dies in exact registration with said first dies and alternately for unlocking said second dies, means cooperating with the last mentioned means and movable thereby to one position when any second die is unlocked for positively preventing said first and second dies from mating even though in exact registration position and to another position when all second dies are locked for permitting mating between any registered first and second die.

5. A card punching device as in claim 4 wherein said set of first dies comprises a stripper plate having a plurality of columns of die apertures therein, said guide means being integral with said stripper plate, a cutting plate disposed beneath said stripper plate, said cutting plate having a plurality of columns of die apertures therein in exact alignment with the die apertures of said stripper plate, means separating said cutting plate from said stripper plate to allow for passage of a card therebetween, and a backing plate disposed beneath said cutting plate and having a plurality of columns of die apertures therein in exact alignment with the die apertures of said stripper plate and said cutting plate.

6. A card punching device as claimed in claim 5 wherein said cutting plate includes stiffening means for maintaining said cutting plate rigid during the de-mating of any first and second die.

7. A card punching device comprising a base member, a set of first cutting dies arranged in columns in said base member, each column having a predetermined number of said dies, a top member hinged to one end of said base member, a set of second dies disposed within said top member in a plane substantially parallel to and spaced from said set of first dies, each of said second dies cooperating with one of said columns of first dies and providing a mate therefor, a plurality of slides one for each second die and integral therewith, each of said slides having a plurality of notches therein and each adapted to independently slide along its associated column of first dies, guide means for said slides disposed within said top member, said set of first cutting dies including additional guide means for said second dies comprising integral ribs disposed in said base member longitudinally between said columns of first dies and adapted to slidingly engage said second dies, said slides and second dies being of different metal than either of said guide means, control means comprising a pin movable transversely of said slides and said guide means to engage a notch at least in said slides to lock the slides and the associated second dies in any exact registration position or to unlock the slides, and a spring biased pivoted lever normally disposed in a blocking position to prevent any mating between any first and second die, one end of said lever being provided with a detent which cooperates with said pin to pivot said lever out of its blocking position when said pin locks said second dies in exact registration position, to allow for relative movement between said first and second dies for mating, said lever returning to its normal blocking position upon the unlocking of any of said second dies by said pin, releasable connecting means at the unhinged ends of said base and top members to limit the relative movement of said members away from each other, and a spring normally urging said members away from each other.

8. A card punching device including a template having a plurality of spaced apertures arranged at least in one column, a male die relatively movable along said column into registration with any of said apertures, said template and die being spaced apart and relatively movable toward one another to effect mating of the die and any of said apertures with which it is registered, means for releasably locking said die relative to said template in any one of the die-aperture registration positions, and means cooperating with the last mentioned means for limiting the possible relative movement of the template and die toward one another to an amount less than that required to effect even initial mating of the die and any of said apertures, said limiting means being operable to cause said limiting only during the time the releasable locking means is released.

9. In a card punching device which includes a set of first dies arranged in columns in a given plane, each column having a predetermined number of said dies, and a set of second dies disposed in a second plane, each of said columns of first dies being associated with a different one of said second dies with the so associated dies being mates, each of said second dies being independently movable in said second plane to any one of a plurality of registration positions relative to the first dies in an associated column, the sets of first and second dies being normally spaced apart but relatively movable toward one another at least the distance necessary to effect mating between any registered first and second die, the improvement comprising means for releasably effectively locking each of said second dies in a registration position with any of the respectively associated first dies, and means cooperating with the last mentioned means for preventing relative movement between the first and second die sets at least to an extent less than the said distance necessary to effect mating but only during the time any second die is effectively unlocked so as to be movable along its associated column of first dies, to prevent during such time inadvertent mating of registered dies and damage to unregistered dies.

10. In a card punching device which includes a set of first dies arranged in columns in a given plane, each column having a predetermined number of said dies, and a set of second dies disposed in a second plane, each of said columns of first dies being associated with a different one of said second dies with the so associated dies being mates, each of said second dies being independently movable in said second plane to any one of a plurality of registration positions relative to the first dies in an associated column, the sets of first and second dies being normally spaced apart but relatively movable toward one another at least the distance necessary to effect mating between any registered first and second die, the improvement comprising means for releasably and effectively but positively locking each of said second dies in a registration position with any of the respectively associated first dies to cause every so locked second die to be immovable in said second plane along its associated first die column, and means cooperating with the last mentioned means for positively preventing relative movement between the first and second die sets at least to an extent less than the said distance necessary to effect mating but only during the time any second die is effectively unlocked so as to be movable along its associated column of first dies, to prevent during such time inadvertent mating of registered dies and damage to unregistered dies.

11. In a card punching device which includes a set of first dies arranged in columns in a given plane, each column having a predetermined number of said dies, and a set of second dies disposed in a second plane, each of said columns of first dies being associated with a different one of said second dies with the so associated dies being mates, each of said second dies being independently movable in said second plane to any one of a plurality of registration positions relative to the first dies in an associated column, the sets of first and second dies being normally spaced apart but relatively movable toward one another at least the distance necessary to effect mating between any registered first and second die, the improvement comprising means for effectively but positively locking each of said second dies in a registration position with any of the respectively associated first dies to cause every so locked second die to be immovable in said second plane along its associated first die column and for effectively but positively unlocking said second dies so they again become independently movable as aforesaid, and means cooperating with the last mentioned means for positively preventing, only while any one of the second dies is unlocked, the necessary relative movement to effect even initial mating of any first and second die, and for effectively permitting, only when every second die is locked in a respective given position, mating between each registered first and second die.

12. In a card punching device which includes a set of first dies arranged in columns in a given plane, each column having a predetermined number of said dies, and a set of second dies disposed in a second plane, each of said columns of first dies being associated with a different one of said second dies with the so associated dies being mates, each of said second dies being independently movable in said second plane to any one of a plurality of registration positions relative to the first dies in an associated column, the sets of first and second dies being normally spaced apart but relatively movable toward one another at least the distance necessary to effect mating between any registered first and second die, the improvement comprising means for effectively locking each of said second dies in a registration position with any of the respectively associated first dies and for effectively unlocking said second dies so they again become independently movable as aforesaid, and means cooperating with the last mentioned means for preventing, only while any one of the second dies is unlocked, the necessary relative movement to effect even initial mating of any first and second die, and for effectively permitting, only when every second die is locked in a respective given position, mating between each registered first and second die.

13. A device as in claim 12 including a plurality of independent means movable and respectively operatively connected to said second dies for independently moving the second dies along their respective columns of first dies, the first mentioned means comprising means cooperating with said independent moving means for positively preventing any movement of the second dies along their respective columns of first dies and alternately for positively permitting free movement by the independent moving means of the second dies along their respective columns of first dies, thereby effectively locking and unlocking said second dies as aforesaid.

14. A device as in claim 13 wherein each independent moving means comprises a different slide, each slide having a plurality of notches, and wherein the means for alternately preventing and permitting movement of the second dies by the independent moving means includes means for alternately positively engaging and positively disengaging the notches in said slides.

15. A device as in claim 12 including means for independently moving each of said second dies to any one of a plurality of registration positions relative to any one of the first dies in an associated column, and means for verifying, after a card is punched, the accuracy of the setting of the second die moving means during the punching of said card.

16. A card punching device including a set of first dies arranged in columns in a given plane, each column having a predetermined number of said dies, a set of second dies disposed in a second plane, each of said second dies cooperating with one of said columns of first dies and providing a mate therefor, means for independently moving each of said second dies in said second plane along its cooperating column of first dies to registration with any one of said first dies, the sets of first and second dies being normally spaced apart but relatively movable toward one another at least the distance necessary to effect mating between any registered first and second die, said means comprising slides respectively secured to said second dies and adapted for sliding motion relative to said columns of first dies, means for effectively guiding said second dies to substantially prevent lateral movement thereof relative to said columns of first dies, and control means comprising locking means movable with respect to said slides between two positions respectively to engage and disengage the slides for effectively locking the second dies in any registration position or unlocking the second dies for freedom of movement along their respective first die columns, and blocking means movable between two positions respectively in conjunction with movement of the locking means between its two positions for effectively blocking, while in one position and only during the time the locking means disengages any one of said slides, relative movement between the first and second die sets at least to an extent less than the said distance necessary to effect mating, the blocking means when in its other position and only during the time the locking means engages all of said slides being operative to permit relative movement between the first and second die sets of at least said necessary distance.

17. A device as in claim 16 including first support means for supporting said set of first dies, second support means for supporting said set of second dies, said first and second support means being normally spaced apart but relatively movable toward one another, one of said support means having operatively connected therewith a stud which extends toward the other support means, the said other support means having operatively connected therewith an aperture for receiving said stud, the aperture and stud being normally spaced apart, said blocking means being operative to prevent said stud from entering its aperture only during the time said locking means disengages any one of said slides to preclude even initial mating of any first and second die and alternately operative while the locking means engages all of said slides to allow said stud to be received by its aperture to effect mating between any registered first and second die when the first and second die sets are relatively moved toward each other.

18. A card punching device as claimed in claim 16 wherein said second dies and associated slide are made of metal, and wherein said means for effectively guiding said second dies are made of a different metal than said second dies and slides.

19. A card punching device including a plate having a set of die apertures arranged in columns in a given plane, each column having a predetermined number of said apertures, a set of male dies disposed in a second plane spaced from said given plane at least in the area of said die aperture set, each of said male dies cooperating with one of said columns of die apertures and providing a mate therefor, means including a different slide for each male die for independently moving each of said male dies in said second plane along its cooperating column of die apertures to registration with any one of said apertures, means for slidably holding said slides, the male dies being secured to and depending from said slides respectively, and means secured to said plate for guiding said depending male dies to prevent lateral movement thereof relative to said columns of die apertures.

20. A card punching device as in claim 19 wherein the male dies depend from their respective slides substantially at one end thereof and the slide holding means is disposed above said given and second planes and guides at least a portion of the part of each slide which extends away from one end of said die plate to prevent lateral movement of the slides.

21. A card punching device as in claim 20 wherein the slides are of different metal than at least that part of the slide holding means laterally adjacent the slides for preventing binding therebetween.

22. A card punching device as in claim 19 wherein the depending male die guiding means includes a plurality of spaced apart ribs secured to said plate to form for each dependent male die a different groove, the sides of each male die being in sliding engagement with the sides of its respective groove as it is moved over its associated column of die apertures.

23. A card punching device as in claim 22 wherein said ribs are of a different metal than said depending male dies for preventing binding therebetween.

24. A card punching device including a set of first dies arranged in columns in a given plane, each of said columns having a predetermined number of said dies therein, a set of second dies arranged in a second plane spaced from said columns of first dies in the area of said first dies, each of said second dies being movable along its associated column of first dies and being a mate therefor, means for moving each of said second dies independently along its associated column of first dies to an exact registration position with any of said first dies, and control means including a die lock releasably locking said second dies in any of a plurality of different positions including any exact registration position for preventing movement by said moving means of the second dies when so locked, means for relatively moving said sets of dies toward each other for die mating purposes, and single actuating means movable to two positions for mutually exclusively operating (a) said die lock to cause release thereof for unlocking said second dies so they may be independently moved as aforesaid and (b) said die set moving means to cause relative movement of said die sets toward each other, the arrangement being such that the locking by said die lock can be released by said actuating means to cause said unlocking only when the actuating means is moved to one of said positions and when in that position the actuating means is unable to effect even initial mating of any registered first and second die, while movement of the actuating means from said one position to the other of said two positions allows the die lock to again perform its locking function and then and only then does the actuating means operate said die set moving means to effect mating of any registered first and second die.

25. A card punching device as in claim 24 wherein said means for moving each of second dies independently comprises a plurality of slides integrally formed respectively with said second dies, each slide having a plurality of notches and wherein said die lock comprises means for biasingly engaging one of said notches in each of said slides to lock said slides and therefore said second dies as aforesaid.

26. A card punching device as in claim 25 wherein said die lock includes a pivoted lever and a detent, said detent being adapted to engage any notch of each slide to lock each of said slides in any exact registration position, spring means normally biasing said lever and said detent into engagement with said slides, cam means disposed to cooperate with said lever, said die set moving means comprising a second pivoted lever having one of said die sets secured thereto, said cam means also being disposed to cooperate with said second lever but mutually exclusively as to the first mentioned lever, whereby movement of said cam means in one direction unlocks said slides and effectively prevents mating of any first and second die, while movement in another direction locks said slides and causes said one die set to move relative to the other of said die sets for mating.

27. A card punching device comprising a set of first dies arranged in columns in a given plane, each column having a predetermined number of said dies, a set of second dies disposed in a second plane substantially parallel and spaced from said given plane, said second dies being respectively associated with said columns of first dies, each of the first dies in each column being mates for the associated second die, means for each of said second dies for independently positioning same in said second plane along the associated column of first dies to at least approximate registration with any one of said first dies in the associated column, means for effecting substantially exact registration as between said second dies and any one of the respectively associated first dies at least when the second dies are in said approximate registration, means for providing for relative movement between said sets of first and second dies to effect mating between any substantially exactly registered first and second dies, the means for effecting substantially exact registration also operating to lock said second dies in any of their possible substantially exact registration positions and also in a non-registration position in which the second dies are beyond one end of their associated column of first dies and includes means for unlocking said second dies from any of their possible registration and non-registration positions, and single means for engaging said unlocking means in a first independent movement to operate the unlocking means without then operating said relative movement means, said single means also acting to engage said relative movement means in a second independent movement for operation thereof without then operating said unlocking means.

28. A card punching device comprising a template having a plurality of apertures arranged in a predetermined number of columns and rows, each aperture being common to only one column and one row and forming an independent female cutting die, a plurality of male cutting dies equal in number to the number of said columns, a slide for each of said male dies, each of said slides being movable so as to move the associated male die at least from one end to the other of an associated column of apertures, means for independently moving said slides so as to position its male die in at least approximate registration with one of the apertures in the associated column, means including unlocking means for releasably locking any of said male dies out of possible registration with any of said apertures and to urge any one of the male dies from an approximate registration position into substantially exact registration with any of the associated column apertures and to releasably lock same therein, means including indicia for indicating different possible registration positions of the second dies with their respective column apertures, means for providing for relative movement between said male dies and said template to effect mating between any substantially exactly registered male and female cutting dies, and means engageable with said relative movement means for then actuating only said relative movement and alternately engageable with the unlocking means for then actuating only the unlocking of the male dies from any locked in position.

References Cited in the file of this patent

UNITED STATES PATENTS

| | | |
|---|---|---|
| 217,640 | Roberts et al. | July 15, 1879 |
| 1,061,883 | Tily et al. | May 13, 1913 |
| 1,424,856 | Spicer | Aug. 8, 1922 |
| 1,430,014 | Hyman | Sept. 26, 1922 |
| 2,206,116 | Ohmer | July 2, 1940 |
| 2,366,708 | Davidson et al. | Jan. 9, 1945 |
| 2,873,627 | Smith | Feb. 17, 1959 |